United States Patent [19]
Dean et al.

[11] Patent Number: 5,901,211
[45] Date of Patent: May 4, 1999

[54] SYSTEM AND METHOD FOR AUTOMATICALLY TRANSFERRING CALLS OR ALLOWING ACCESS

[75] Inventors: Matthew T. Dean, Campbell; William Joseph Beyda, Cupertino; Shmuel Shaffer, Palo Alto, all of Calif.

[73] Assignee: Siemens Business Communication Systems, Inc., Santa Clara, Calif.

[21] Appl. No.: 08/796,170

[22] Filed: Feb. 6, 1997

Related U.S. Application Data

[63] Continuation-in-part of application No. 08/716,116, Sep. 19, 1996, Pat. No. 5,802,147.

[51] Int. Cl.⁶ ..................................................... H04M 3/42
[52] U.S. Cl. ..................... 379/211; 379/102.06; 340/543; 340/825.31
[58] Field of Search ................................. 379/67, 88, 89, 379/210, 211, 212, 102.06, 102.07, 102.01; 340/542, 543, 825.31, 825.34

[56] References Cited

U.S. PATENT DOCUMENTS

| | | | |
|---|---|---|---|
| 4,275,385 | 6/1981 | White | 340/312 |
| 4,313,035 | 1/1982 | Jordan et al. | 379/211 |
| 4,601,064 | 7/1986 | Shipley | 379/211 |
| 4,752,951 | 6/1988 | Konneker | 379/211 |
| 5,414,759 | 5/1995 | Ishikuri et al. | 379/88 |
| 5,802,147 | 9/1998 | Beyda et al. | 379/67 |

Primary Examiner—Fan S. Tsang
Attorney, Agent, or Firm—Heather S. Vance

[57] ABSTRACT

A switching system for automatically transferring a call is provided. A detecting unit (80) is used to detect an event. First and second outputs (10, 20) are provided for receiving an incoming call. A switch (12) automatically switches from the first output (10) to the second output (20) when the event occurs. Thus, the incoming call is received by the first output (10) before the event occurs, and by the second output (20) after the event occurs. In another embodiment of the invention, a switching system for automatic user access is provided. In this embodiment, a detecting unit (80) is again used to detect an event. An output device (106, 107) is also provided. Both the detecting unit and the output device (106, 107) are coupled to a processor (100). Access to the output device (106, 107) is automatically granted by the processor (100) after the event occurs.

3 Claims, 6 Drawing Sheets

SYSTEM AND METHOD FOR AUTOMATICALLY TRANSFERRING CALLS OR ALLOWING ACCESS

CROSS REFERENCE TO RELATED APPLICATION

This application is a continuation-in-part of U.S. patent application Ser. No. 08/716,116, filed Sep. 19, 1996, now U.S. Pat. No. 5,802,147, which is incorporated herein by reference in its entirety for all purposes.

BACKGROUND OF THE INVENTION

1. Field of the Invention

The invention relates to a system and method for automatically transferring calls or allowing access based on received signals, and more particularly to transferring calls to a wireless system or allowing access to a confidential area when a signal is received from a detecting system.

2. Description of the Related Art

Wireless telephone systems which utilize cellular telephones are common and readily available. Electronic door lock systems are also common. For example, many hotels employ electronic door lock systems and many hotel clientele utilize cellular telephones. Presently, while staying at a hotel, a user can forward telephone calls from a personal cellular telephone to a telephone in their hotel room. In this arrangement, the user must remember to manually disable the telephone call forwarding when leaving the hotel room. If a user forgets to forward the telephone calls to the hotel room, the user would have to answer any incoming telephone call on the cellular telephone and incur the associated air time costs. Also, if the user forgets to manually disable the telephone call forwarding after leaving the hotel room, the user may miss an important telephone call which is forwarded to the telephone in the vacant hotel room.

If the telephone calls are forwarded from the hotel room telephone to the cellular telephone, the same problems arise if the user forgets to disable the forwarding. In addition, this arrangement provides little security for the user. Anyone with access to the user's hotel room (e.g., the maid) can pick-up the telephone and enable (or disable) a telephone call forwarding setting.

In public wireless systems, it is desirable to reduce air time usage, and therefore reduce air time charges. Similarly, in private wireless systems, it is desirable to reduce congestion on an internal network. Thus, it is desirable to have automatic transferring between in-room telephones and cellular telephones which provides both the desired cost reduction and the desired congestion reduction. It is also desirable to provide a system in which the user does not have to remember to enable and disable the telephone call forwarding. Finally, it is desirable to provide a system where only the user can enable and disable the telephone call forwarding.

In a business environment, different levels of access to confidential information can be provided to employees with different levels of security. Usually passwords or encoded cards/keys are used to provide an employee's level of security clearance. The passwords are typically entered into a keyboard, and the encoded cards/keys are usually physically placed in a card/key reader. These passwords and encoded cards/keys can be copied or stolen. Also, the card/key readers often break or malfunction from constant physical use. An employee may forget a password or forget to insert an encoded card/key. Thus, it is desirable to have a system which does not require passwords or encoded cards/keys. When a multi-access security system is used, it is usually desirable to provide as much security as possible. Therefore, an automatic input in addition to a password or the manual insertion of a key provides another, transparent level of security which is desirable.

SUMMARY OF THE INVENTION

According to the invention, in one embodiment, a switching system for automatically transferring a call is provided. A detecting unit is used to detect an event. An event might be, for example, an electronic key being used to open a door. First and second outputs are provided for receiving an incoming call. The first and second outputs might be, for example, a in-room telephone and a cellular telephone. A switch automatically switches from the first output to the second output when the event occurs. Thus, the incoming call is received by the first output before the event occurs and by the second output after the event occurs.

In another embodiment of the present invention, a switching system for automatic user access is provided. A detecting unit is again used to detect an event. An output device, such as a computer or a door lock, is also provided. Both the detecting unit and the output device are coupled to a processor. Access to the output device is automatically granted by the processor after the event occurs.

DETAILED DESCRIPTION

The present invention transfers calls to a wireless system or allows access to a confidential area when a signal from a detecting system is received. In one embodiment of the invention, a wireless telephone system is connected to an electronic door lock system with a switch (e.g., a PBX or a central office). The electronic door lock system is typically operated by either a magnetically or mechanically encoded card which acts as a hardware password. This hardware password controls the destination of incoming telephone calls. For example, an incoming telephone call can be routed to a wireless telephone or to an in-room telephone. When the electronic door lock is provided with the correct encoded card, telephone calls are automatically forwarded from the user's wireless telephone to the in-room telephone.

In the preferred embodiment, an intelligent interconnection exists between a wireless telephone system and an electronic door lock system. While the following description is directed to a wireless telephone system and an electronic door lock system, the present invention can be used for transferring any type of call (e.g., a facsimile call or a multimedia call to a computer monitor or to a video screen) based on a signal from any type of detecting system (e.g., infra-red detecting system, radio detecting system, magnetic detection system, bar code reading system, optical character recognition system, etc.). Similarly, the present invention can be implemented in many environments. For example, implementation can occur in the hotel industry, in a business environment, in a residential environment, in a factory environment, in a warehouse environment or in a transportation system (e.g., reading license plates on automobiles).

Figure 1:
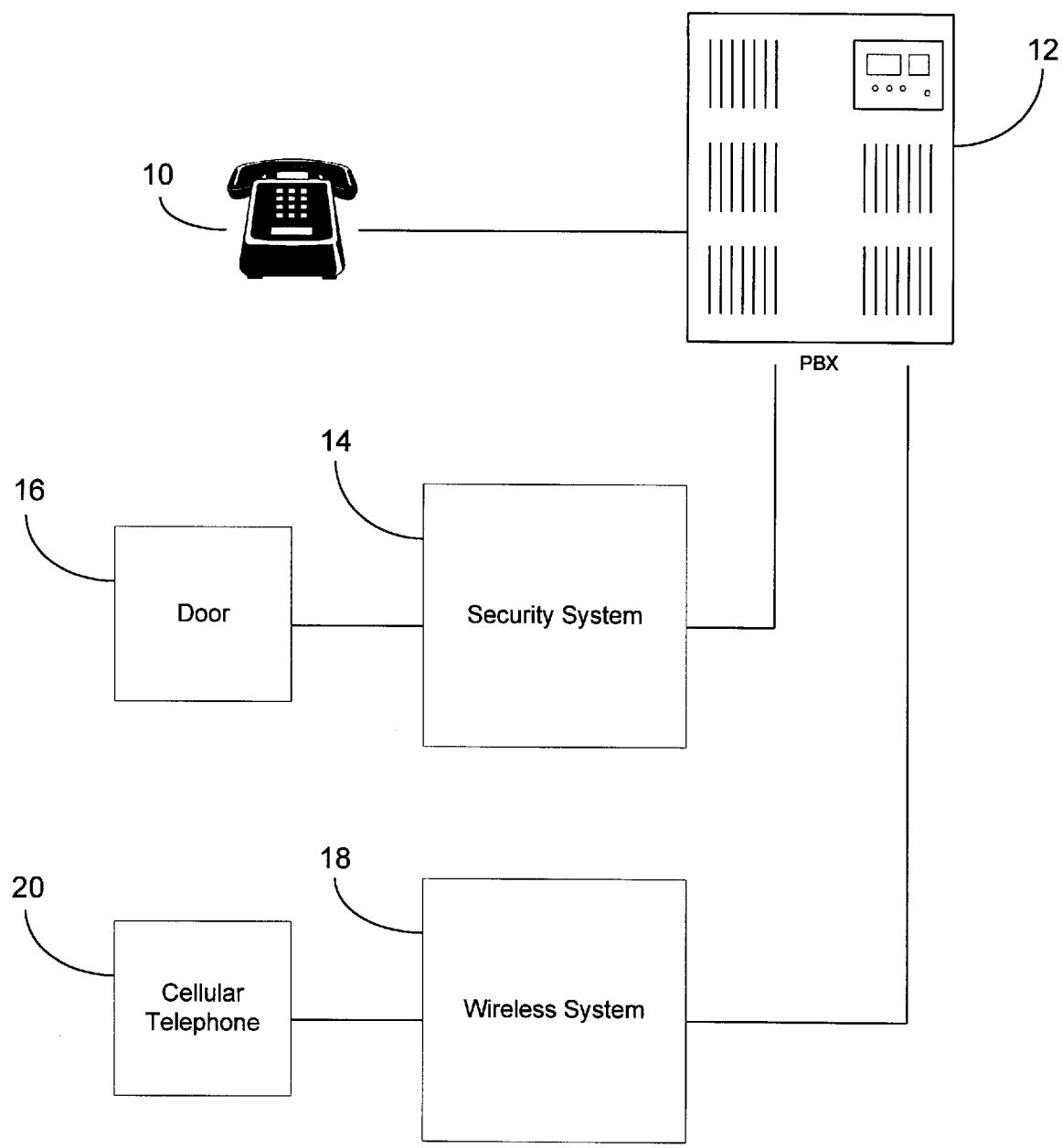
FIG. 1 illustrates an environment for a first embodiment of the present invention.

FIG. 1 illustrates an environment for a first embodiment of the present invention. In this environment, a hotel telephone 10 is connected to a PBX 12. Door lock security system 14 is also connected to PBX 12 and is capable of receiving inputs from hotel room door 16. For example, an electronic door key can be used to provide an input to door lock security system 14. Door lock security system 14 may include a location register. A location register contains a database or table with user identification and user location information. When a user enters the hotel room with an electronic door key, a signal is sent to security system 14 and the location register is automatically updated with the user's new location.

Wireless system 18 is coupled to PBX 12 such that communication between the two systems is possible. For example, Wireless system 18 and PBX 12 can be connected by a digital link. Wireless system 18 is connected to wireless/cellular telephone 20. In this arrangement, when a hotel guest inserts a key into the door lock, (1) the forwarding of telephone calls to the guest's cellular telephone is automatically canceled or (2) the forwarding of telephone calls to the guest's in-room telephone is enabled.

Figure 2:
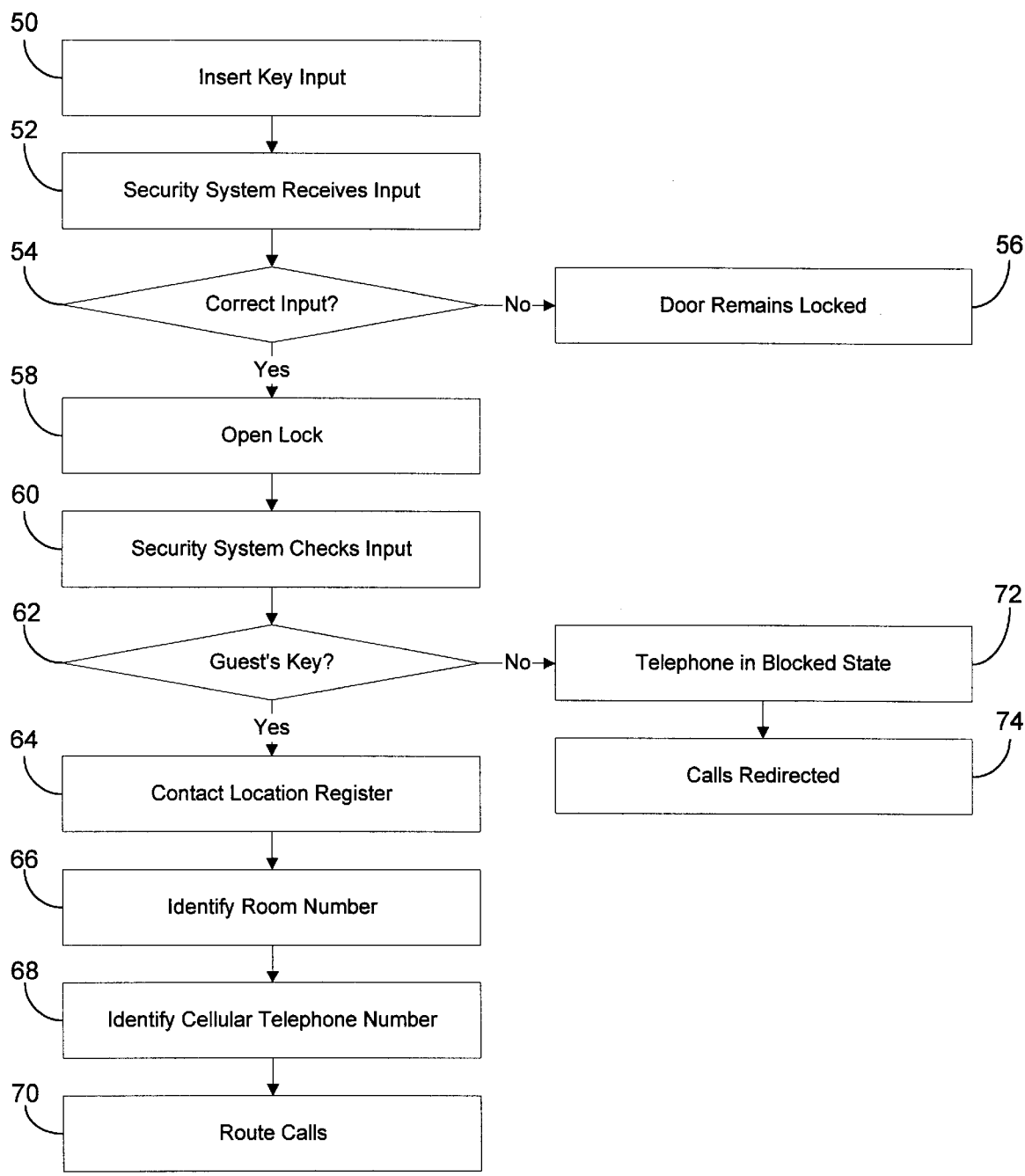
FIG. 2 provides a process flowchart for the first embodiment of the present invention.

FIG. 2 provides a process flowchart for the first embodiment of the present invention. At step 50, a hotel guest inserts a key into the guest's hotel room door lock. In the preferred embodiment, the key is a magnetically or mechanically encoded card, and the door lock is an electronic door lock. If the door is a mechanical door lock, a separate sensor can be used to determine when the correct key is inserted into the mechanical door lock. This sensor notifies the security system that the correct key has been inserted into the door lock. At step 52, a security system receives the input from the key (or the separate sensor). At step 54, the security system determines if the correct input from the key has been provided. If an incorrect input is provided, the door remains locked at step 56. If a correct input is provided, the door lock is opened at step 58. At step 60, the security system checks the input from the key again. At step 62, the security system determines if the correct guest's key has been provided (i.e., not the maid's key). If the correct guest's key is provided, the location register is contacted at step 64. The database within the location register is updated with the guest's new location. In the preferred embodiment, the guest's room number is identified at step 66, and the guest's cellular telephone number is identified at step 68. Based on this new location, the guest's telephone calls are automatically routed to the telephone in the guest's room at step 70. For example, the forwarding of telephone calls to the cellular telephone may be automatically canceled. In the preferred embodiment, this routing to the in-room telephone is done by a processor located within the PBX.

The present invention can prevent unauthorized use of the guest's hotel room telephone. If the key used to open the door is not the guest's key (e.g., the maid's key), the security system can block the telephone in the guest's hotel room at step 72. In addition (or as an alternative), the PBX can redirect the guest's incoming telephone calls to the hotel operator at step 74.

Figure 3:
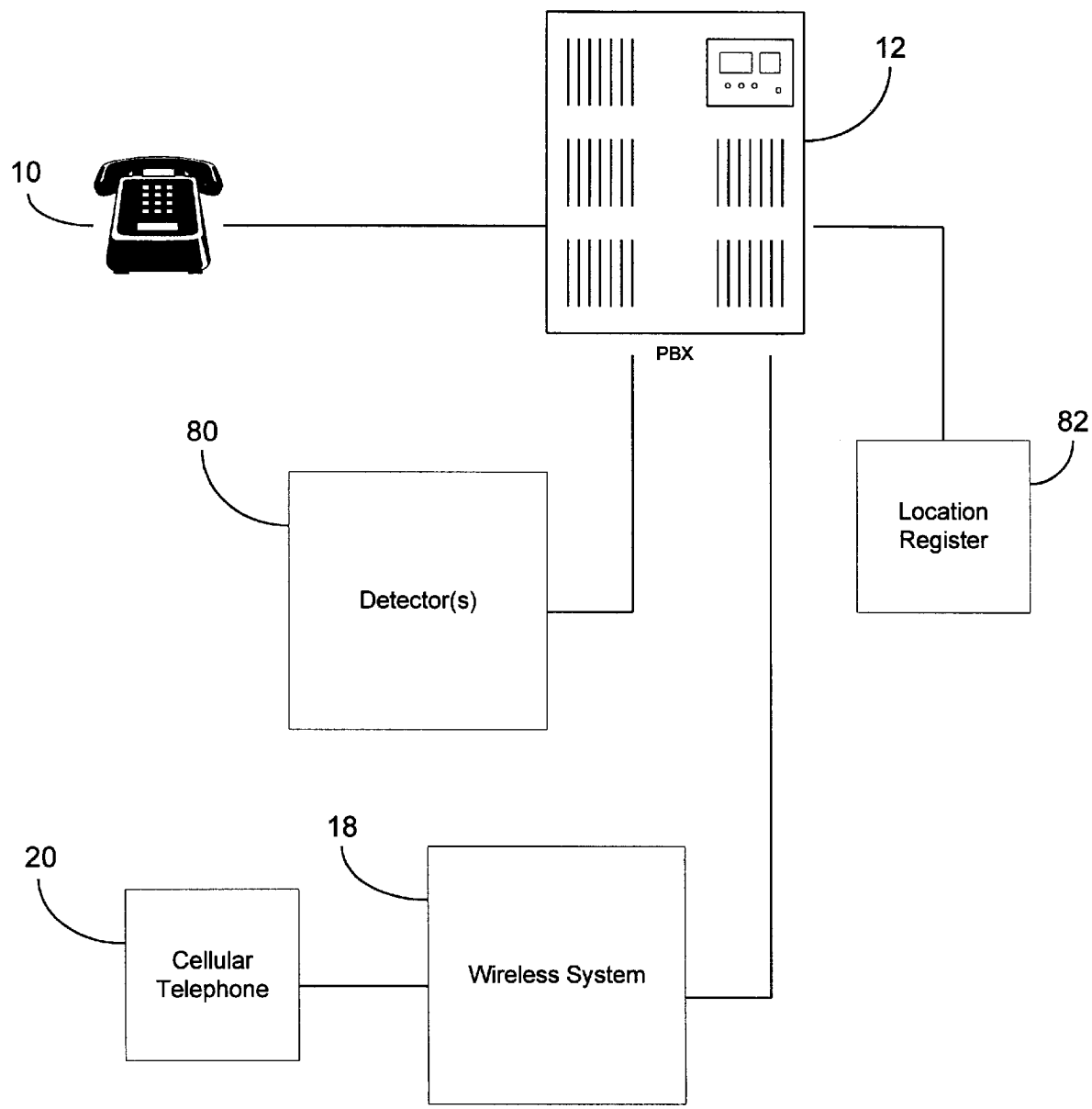
FIG. 3 illustrates an environment for a second embodiment of the present invention.

FIG. 3 illustrates an environment for a second embodiment of the present invention. In this embodiment, hotel telephone 10 is still connected to PBX 12. The door and door lock security system are replaced by general detector 80. This detector 80 is any detection device which can determine if the guest, the guest's room key or the guest's cellular telephone has entered the room. For example, an infra-red detector can sense the temperature change associated with the guest's entering the room, or it can detect an infrared emitter from a room key or from a cellular telephone. Radio technology can be used to sense when a guest's room key or cellular telephone has entered the hotel room. Also, a method similar to that used for library books and for tagging merchandise to prevent theft can be used to indicate when a guest's room key or cellular telephone has entered the hotel room. Finally, by utilizing two sensors in the entry way of the hotel room, the direction of the movement of the guest, the guest's room key or of the guest's cellular telephone can be determined. The accuracy of the routing of the telephone call is improved if two sensors are utilized.

Detector 80 senses when the guest, the guest's room key or the guest's cellular telephone enters a room, and this information is used to determine if the guest's telephone calls will be routed to the hotel room telephone or the cellular telephone. When two sensors are used, the routing of the telephone calls is based on whether the guest (or the guest's room key or cellular telephone) is arriving or departing from the hotel room. In one arrangement, if a detected guest enters the hotel room, the hotel room telephone is enabled and forwarding to the cellular telephone is canceled. Thus, the guest receives telephone calls on the hotel room telephone when the guest is located in the hotel room. This reduces the guest's wireless charges. In another arrangement, if the detector indicates that the cellular telephone is not located in the hotel room, telephone calls are forwarded to the cellular telephone. When detector 80 is used to determine if the guest's room key is located in the hotel room, the system assumes the guest is in the same location as the key and routes the telephone calls accordingly. Again, any detection device can be utilized (e.g., radio technology).

In this second embodiment of the invention, location register 82 is a separate system connected to PBX 12. Again, location register 82 keeps track of the location of the guest (or the guest's cellular telephone or the guest's room keys). This location is used by PBX 12 for routing the guest's telephone calls to either the cellular telephone or the hotel room telephone.

Figure 4:
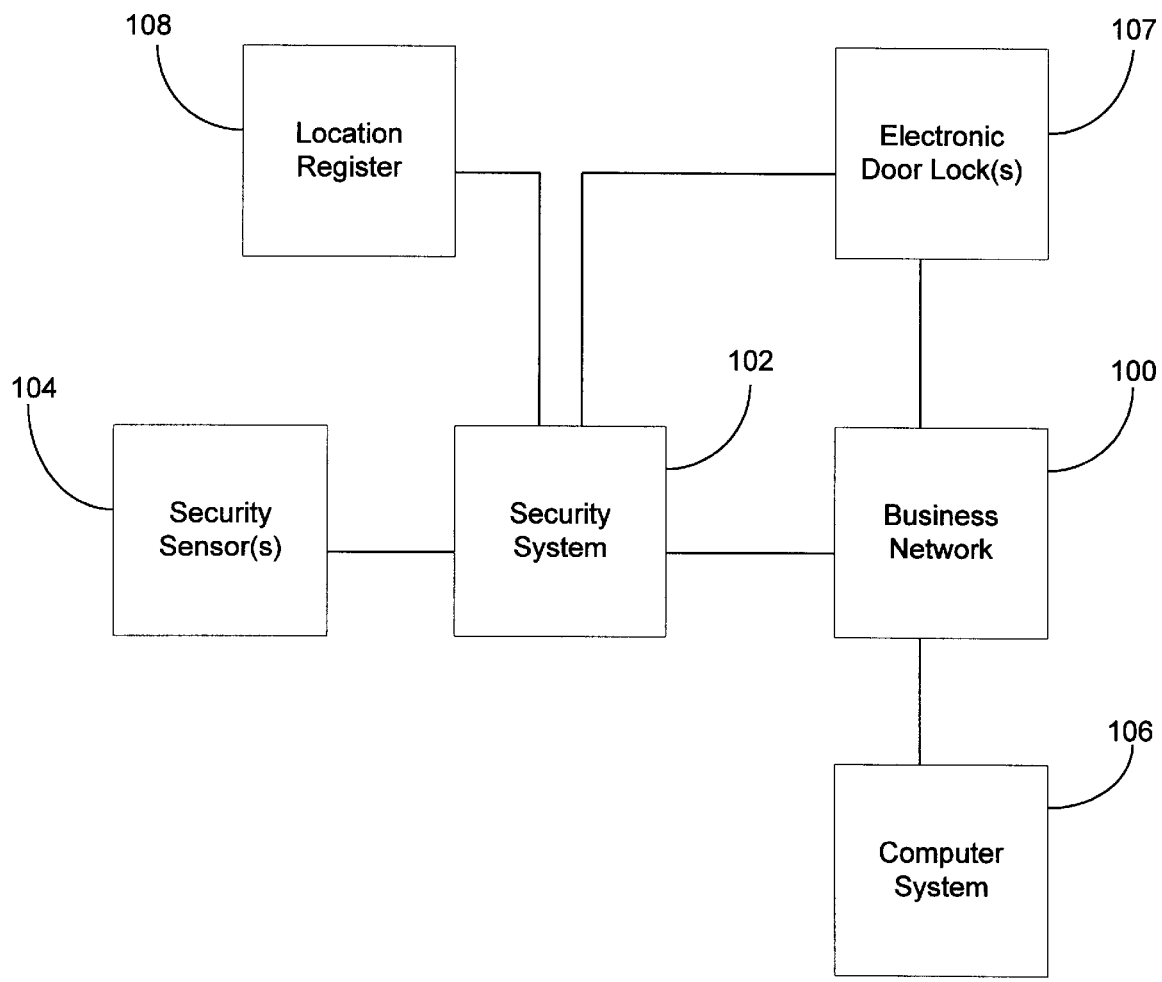
FIG. 4 illustrates an environment for a third embodiment of the present invention.

FIG. 4 illustrates an environment for a third embodiment of the present invention. The third embodiment of the invention grants access to confidential information or confidential business areas when a particular signal is received by the detection unit. Each received signal identifies either a particular employee or a particular level of security clearance. In this embodiment, business network 100 is connected to security system 102. Security system 102 receives information from security sensor 104. In the preferred embodiment, security system 102 is an electronic security system with electronic security sensors. Security sensors 104 can monitor the location of various business employees. For example, employees may wear badges which identify their location as they pass through monitored areas (e.g., doors or doorways). Business network 100 is coupled to many peripheral devices such as computer system 106. In this arrangement, security system 102 can provide access to certain peripheral devices depending on a user's clearance status. For example, when an identified engineer enters an area with a computer, that computer may automatically provide access to engineering files. A log-on may still be required to ensure even greater security.

Thus, the present invention allows access based on a user's location and that user's clearance level. This access may be for logging onto a computer or for accessing different levels of secure information. Access to certain documents may only be available if a certain user is in the building. Access to certain areas within the business can also be based on an identified employee's security clearance level. For example, electronic door lock 107 may become unlocked when an employee with the correct security clearance approaches it. In this example, electronic sensors are placed before electronic door lock 107 for detecting the approaching employee, and electronic door lock 107 is controlled by either business network 100 or security system 102. The user's location is again listed in a database or table in location register 108. In the preferred embodiment, location register 108 is connected to security system 102.

Figure 5:
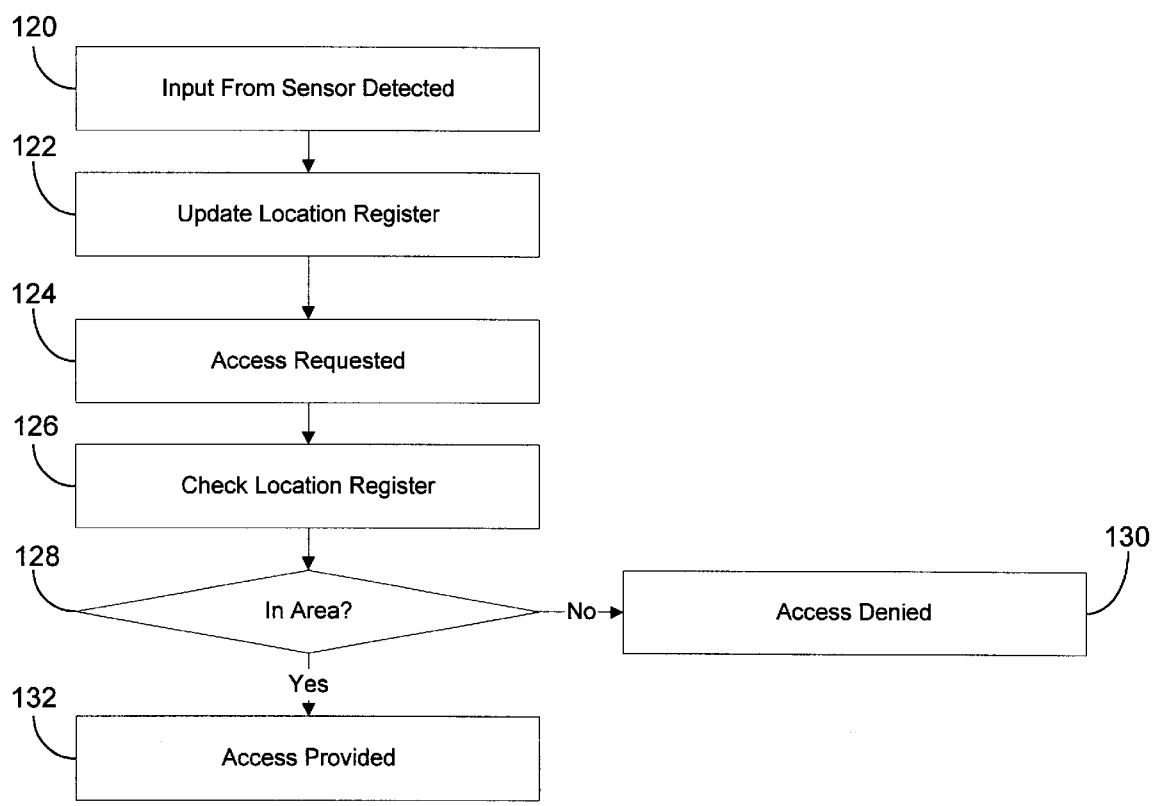
FIG. 5 provides a first process flowchart for the third embodiment of the present invention.

FIG. 5 provides a first process flowchart for the third embodiment of the present invention. At step 120, input from a security sensor is detected. The input provides employee location information. For example, radio technology can be used to identify an employee's badge when the employee passes from one room to another room within the business complex. At step 122, the location register is updated with the information from the security sensor. At step 124, a request is made for access to confidential information (e.g., confidential engineering files) or to confidential business areas. For example, the employee may call up the confidential files on an available computer system. At step 126, the system checks the location register for employees with clearance to the confidential information. At step 128, the system checks if the employees with clearance are located in the area where access is requested. If none of these employees are located in the area, access is denied at step 130. If an employee with clearance is located in the area where access was requested, access is provided at step 132.

Figure 6:
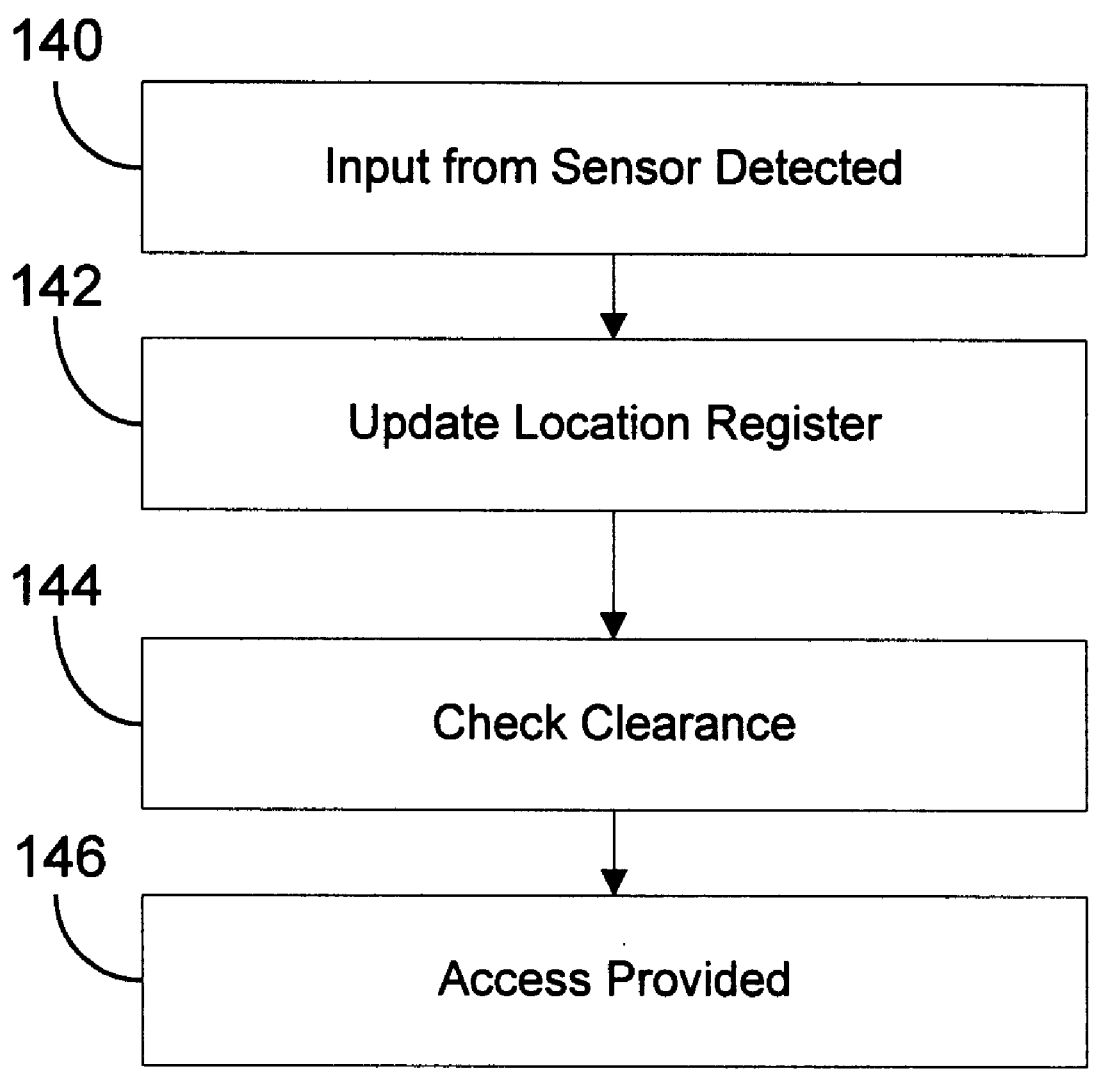
FIG. 6 provides a second process flowchart for the third embodiment of the present invention.

FIG. 6 provides a second process flowchart for the third embodiment of the present invention. At step 140, input from a security sensor is detected. At step 142, the location register is updated with information from the security sensor. At step 144, the system checks the employees clearance status. At step 146, the employee is automatically given access to all the peripherals (e.g., computers) and/or areas in the employees immediate vicinity. In this embodiment, the employee does not need to request access.

We claim:

1. A switching system for automatically transferring a call, comprising:

a detecting unit capable of detecting an event;

a first output capable of receiving an incoming call;

a second output capable of receiving the incoming call; and a switch coupled to the detecting unit for automatically switching from the first output to the second output when the event occurs;

wherein the incoming call is received by the first output before the event occurs;

wherein the incoming call is received by the second output after the event occurs; and wherein the first output and the second output are at least one of a computer monitor and a video screen.

2. A method for automatically transferring a call, comprising the following steps:

receiving an electronic input from a detecting unit, the electronic input indicating an event;

first checking the electronic input for granting access to an area based on the input;

second checking the electronic input for automatically directing calls to at least one of a first output and a second output based on the input.

3. The method for automatically transferring a call of claim 2, wherein the first output and the second output are at least one of a a computer monitor and a video screen.

* * * * *